Oct. 2, 1923.                                              1,469,527
                    C. W. OUDERKIRK
                    SHAFT COUPLING
                    Filed Nov. 27, 1920

WITNESSES                                    Inventor
                                        CHARLES W. OUDERKIRK
                                        By Richard B. Owen
                                                    Attorney Patented Oct. 2, 1923.

1,469,527

UNITED STATES PATENT OFFICE.

CHARLES W. OUDERKIRK, OF MOUNT PLEASANT, MICHIGAN.

SHAFT COUPLING.

Application filed November 27, 1920. Serial No. 426,776.

*To all whom it may concern:*

Be it known that I, CHARLES W. OUDERKIRK, a citizen of the United States, residing at Mount Pleasant, in the county of Isabella and State of Michigan, have invented certain new and useful Improvements in Shaft Couplings, of which the following is a specification.

This invention relates to new and useful improvements in shaft couplings and contemplates improvements upon my U. S. Patent #1,261,278, patented April 2nd, 1918, whereby the keys for locking the complementary members together and against relative rotation may be readily removed or disengaged from the complementary members to permit separation thereof.

The accomplishment of the above is contemplated by providing the contacting faces of the flanges with intersecting corresponding grooves, and keys to enter the coinciding grooves whereby one key prevents displacement of another.

Another object of the invention is to provide a device of the above nature wherein one of the keys may only be associated with its corresponding grooves by entering the key in said grooves from the center of the coupling.

Another object of the invention is to provide a simple and inexpensive means and arrangement for preventing accidental displacement of the keys.

Other objects of the invention will become apparent during the course of the following description.

In the accompanying drawings forming a part of the application and wherein like numerals are employed to designate like parts throughout the several views—

Figure 1:
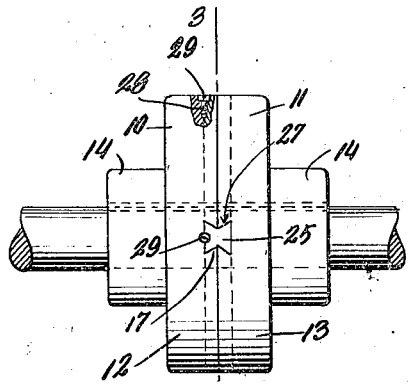
Figure 1 is a side elevation of a flanged coupling constructed in accordance with my invention.
Figure 2:
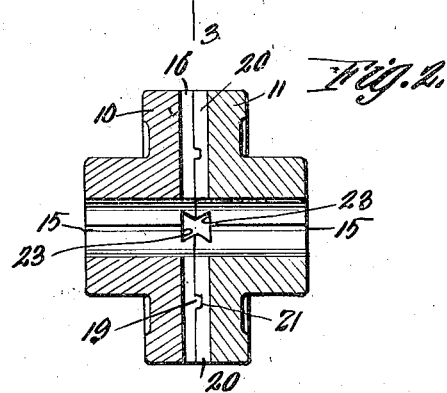
Figure 2 is a longitudinal section of the same.

Referring to the drawings wherein for the purpose of illustration is shown the preferred embodiment of my invention, 10 and 11 indicate generally two complementary members of my improved shaft coupling, each comprising a discus flange 12 and 13 respectively, formed respectively upon their outer faces with bosses 14 which are bored longitudinally to receive the ends of the shafts and said bores being provided with key ways 15 whereby the complementary members may be secured to their respective shaft sections.

Figure 3:
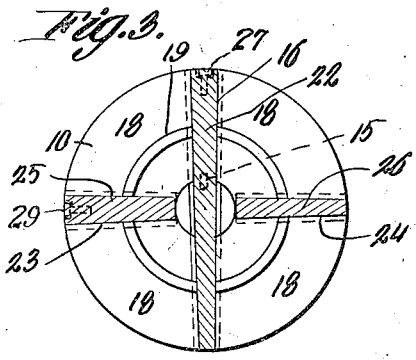
Figure 3 is a transverse section of the invention taken on the line 3—3 of Figure 1.

The member 10 shown in view in Figure 3 is provided upon its face, opposite the face thereof bearing the boss 14 with a diametrically extending groove 16. This groove is undercut or dove-tailed as at 17, more clearly shown in Figure 1. It will be seen that by the provision of other grooves 23 and 24 arranged at right angles to the groove 16, quadrant shaped spaces 18 will be provided which appear as extensions of the front or inner face of the member. Each quadrant is provided with an outwardly projecting arcuate rib 19, the ribs of all of the quadrants collectively forming a concentrically arranged annular rib, as clearly shown in Figure 3.

The complementary member 11 of the coupling is similarly provided upon its inner face with a diametrically extending groove 20 and grooves 23 and 24 and which similarly define four quadrant-shaped extensions on the face of the flange. Each of these extensions on the complimentary member 11 is provided with an arcuate groove 21, which grooves collectively provide the contacting face of the member with a concentrically arranged annular groove for the reception of the annular rib of the complementary member 10, whereby the two members will be centralized and will be prevented from relative sliding movement when assembled.

By referring more particularly to Figure 3 of the drawing, it will be clearly seen that both of the diametrically extending grooves 16 and 20 taper from their larger ends at one side of the coupling to the smaller ends opening into the opposite side of the coupling. A tapered key 22 having opposite sides equipped with V-shaped longitudinally extending grooves is adapted to be inserted into the opening provided by the coinciding grooves 16 when the sections of the coupling are assembled. The grooves 23 and 24 in each flange are arranged in longitudinal alignment so as to extend diametrically across their respective members 10 and 11 and in reality the two grooves 23 and 24 of each member is one groove which is divided in half by the bore extending through the section. This groove constituting the grooves 23 and 24 is tapered from one end to its other and the sides thereof are undercut or dove-tailed as at 27. It will therefore be obvious that the largest ends of the grooves 23 is arranged adjacent the periphery of the members while the largest ends of the grooves 24 are arranged adjacent the center of the members. Two short keys 25 and 26 are adapted for reception in the grooves 23 and 24 respectively and by referring to Figures 1 and 3, it will be seen that the keys are each provided upon opposite edges with longitudinally extending V-shaped slots or recesses 27 which are shaped to fit the undercut grooves 16, 23 and 24 whereby when the keys are inserted, separation of the complementary members of the coupling is precluded. It is of course understood that the coacting member 11 is equipped with corresponding undercut grooves 16, 23 and 24 whereby the grooves of the two members will coincide when the members are centralized by the annular rib 19 coacting with the annular groove 21 as hereinbefore set forth.

Again referring to Figure 3, it will be seen that the key 26 is tapered from its larger inner end down to a smaller end which is arranged adjacent the periphery of the coupling, while the key 25 is tapered from its larger outer end down to its inner smaller end which is arranged adjacent the center of the coupling. However, it is to be understood that the inner end of the key 25 or relatively larger key is of the same dimension as the inner larger end of the key 26, whereby the latter may be moved out through the opening formed by the coinciding grooves 23. It will also be obvious that the keys 25 and 26 may be made as an integral structure and provided with an opening or groove through which the key 22 may extend in order to retain the former in cooperation with the coupling.

To prevent accidental displacement of the keys 22 and 25, a threaded countersunk opening 28 as most clearly shown in Figures 1 and 3 is bored longitudinally of said keys from their larger outer ends, in a manner so that one half of the threaded opening is arranged in the member 10 and the other half of the threaded opening is arranged in the key, so that screws 29 may be threaded into this opening to prevent accidental displacement of the keys.

In order to assemble the complementary members and keys, it will be seen that the contacting faces of the complementary members are brought face to face and moved together so that the annular rib 19 enters within the annular groove 21 whereby the two members will be centered. The complementary members are then rotated relatively until their corresponding grooves 16 and 26 of the two members correspond and the grooves 23 and 24 correspond to those in the coacting member. The relatively short key 26 is then passed through the opening formed by the coinciding grooves 23 and forced into the opening provided by the coinciding grooves 24. This peg cannot move further outwardly of the coupling member, due to its inner larger end abutting the confining walls of the groove.

The relatively long key or wedge 22 is then inserted in the opening formed by the coinciding groove 16 and 20, after which a screw 29 is threaded into the opening 28 to prevent accidental displacement of the long key. Incidentally this key prevents inward movement of the short key 26. The other relatively short key 25 is then moved into the opening formed by the coinciding groove 23, after which a screw 29 is associated with this key in the same manner as the screw is associated with the key 22. Obviously, all of the keys will be prevented from accidental displacement, but when it is desired to separate the complementary members, the screws 29 are removed after which the relatively long key 22 is disengaged from the coupling by applying force to the small end thereof. Pressure is then applied to the relatively small end of the key 26 which moves the same inwardly into abutment with the inner end of the key 25. This force will of course cause both keys 25 and 26 to move out of the coupling, whereby the complementary members may be separated.

The foregoing description and the accompanying drawings have reference to the preferred or approved form of my invention. It is to be understood however, that such changes may be made in construction and arrangement of parts, materials, dimensions etc. as may prove expedient and fall within the scope of the appended claims.

Having thus fully described my invention what I claim as new and desire to secure by Letters Patent is:—

1. A shaft coupling comprising a pair of flanges, the contacting faces of which are provided with corresponding grooves extending from the center of the members, and a key insertible into the coinciding grooves from the center of the coupling.

2. A shaft coupling comprising a pair of members having their contacting faces provided with corresponding grooves, and a key insertible into the coinciding grooves of the members only from the opposite side of said members.

3. A shaft coupling comprising a pair of flanges having their contacting faces provided with corresponding grooves, said grooves being extended from the center of the flanges to opposite sides thereof, and a key insertible through one pair of coinciding grooves into the other part of coinciding grooves from the center of the coupling.

4. A shaft coupling comprising a pair of flanges having their contacting faces provided with intersecting corresponding grooves, and keys to enter the coinciding grooves, one key preventing displacement of another.

5. A shaft coupling comprising a pair of flanges for contact, each having its contacting face formed with a groove tapering from one end to the other, and a pair of grooves at angular relations to the first mentioned groove, one of the second mentioned grooves tapering from the periphery of the flange to the center, the other second mentioned member tapering from the center to the periphery of the flange, a long key to enter the first mentioned grooves, and a pair of short keys to enter the second mentioned grooves from one side of the coupling.

6. A shaft coupling comprising complementary members, the contacting faces of which are provided with intersecting corresponding grooves, the grooves of each member being angularly disposed relative to each other, and the keys insertible into the coinciding grooves, one key preventing the accidental displacement of another.

In testimony whereof I affix my signature in presence of two witnesses.

CHARLES W. OUDERKIRK.

Witnesses:
R. L. THAYER,
W. S. HORN.